Feb. 23, 1954  L. M. KOHLBECK  2,670,112
AUTOMOBILE CLOTHES HANGER SUPPORT
Filed June 15, 1950
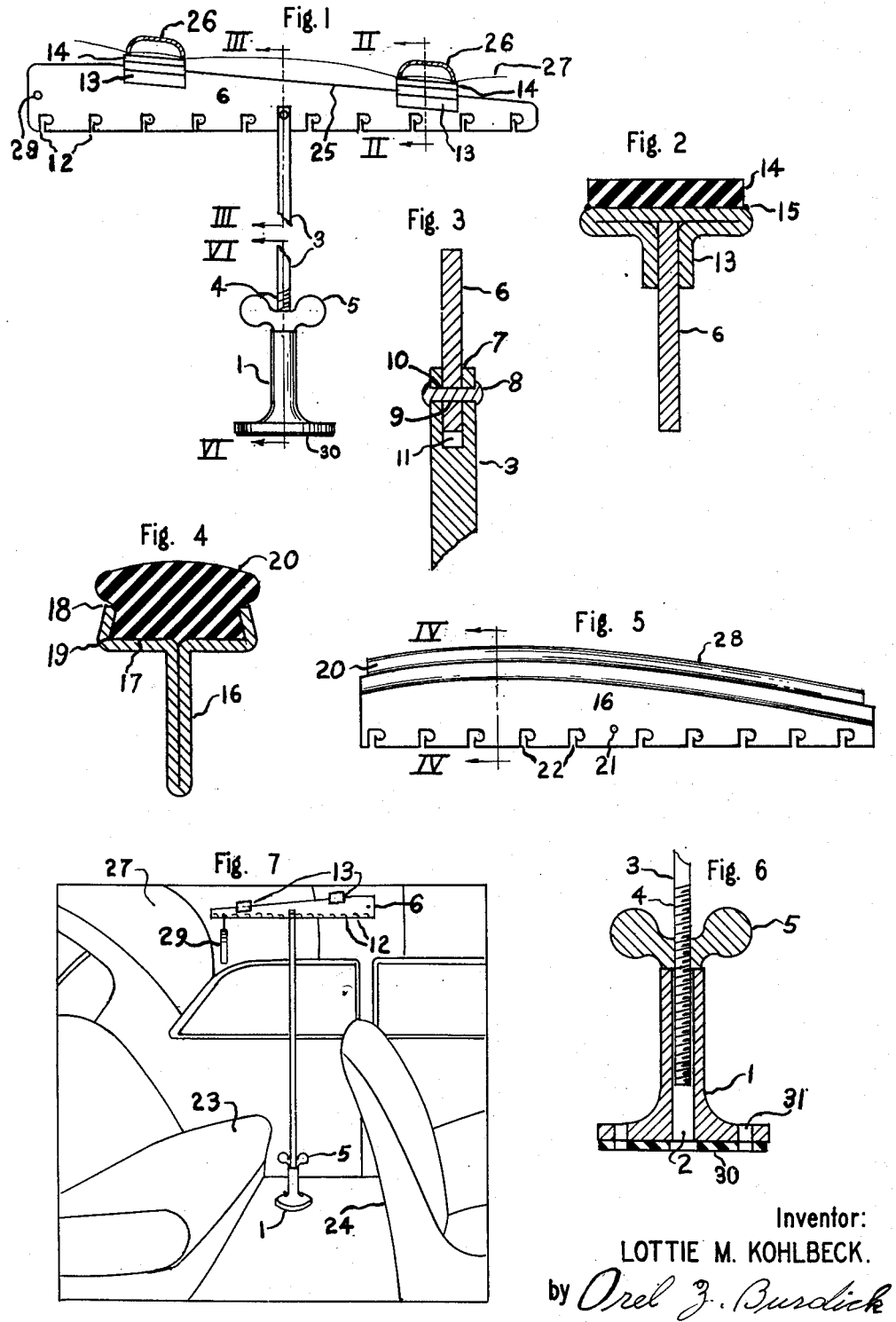
Inventor:
LOTTIE M. KOHLBECK.
by Orel J. Burdick
Attorney.

Patented Feb. 23, 1954

2,670,112

UNITED STATES PATENT OFFICE 2,670,112

AUTOMOBILE CLOTHES HANGER SUPPORT

Lottie M. Kohlbeck, Norton Township,
Muskegon County, Mich.

Application June 15, 1950, Serial No. 168,310

1 Claim. (Cl. 224—42.1)

This invention relates to a clothes hanger support for use in automobiles.

The small hooks provided as standard equipment by automobile manufacturers for hanging clothing over the rear seat are inadequate for the requirements of long trips when a large assortment of clothing must be carried.

Various devices have been suggested and some are now being manufactured in an attempt to meet this need. In general such devices attach to the automobile body by clamping onto windows and doors in various ways and usually are of small capacity. Often they have the difficulty that they interfere with the usual operation of the windows and doors to which they are attached. Large capacity devices have been proposed which have the difficulty that they hold the clothing in such a position as to interfere with the normal use of the rear view mirror.

An additional difficulty met with in many devices for permitting clothing to be hung in the rear of an automobile is that their manner of attaching places them of necessity directly over the rear seat so that only a limited amount of free space occurs directly under them. My device can be so positioned in the automobile body as to make use of the greater depth of free space between the front and back seat of the automobile as well as the more limited space directly over the rear seat. This permits the hanging of a number of longer garments without folding or dragging on the seat.

Large capacity devices attaching permanently to the automobile body have the objection that they require the assistance of a mechanic for their installation, are apt to be regarded as unsightly and may even interfere with the normal use of the rear seat at times when the hanger is not in use. Ideally, such a device should have a large capacity and at the same time be easily removable when not in use, should attach to the automobile body so as to interfere as little as possible with the normal operation of windows and doors and the normal use of the back seat, and should hold the clothing in such a position as to give no substantial obstruction to the use of the rear view mirror. It should preferably support the garments in a crosswise position as there is not sufficient space between the front and back seats of a modern automobile to allow a garment to hang free when hung lengthwise of the car body.

I have provided a solution to this problem in a clothes hanger support which stands on the floor of the automobile and is supported in place in a substantially vertical position by means of tension or stress against the top of the automobile body. In the preferred modification of my clothes hanger supporting assembly some provision is made for having adjustable elements on the uppermost portion of my device or having a contour on the top of my device which will be an approximate match for the contour of the under side of the tops of the majority of popular automobile bodies in use and which takes into account the fact that there may be structural supporting elements in the tops of said bodies.

It is, therefore, an object of this invention to provide such a clothes hanger support adapted to be placed above and in front of the rear seat of an automobile and which will be readily removable in its entirety when not needed.

It is another object of this invention to provide such a clothes hanger support having a large capacity compared with existing devices for this purpose.

It is also an objective of this invention to provide such a clothes hanger support which will give the least possible interference with the normal operation of other accommodations and devices on the automobile.

It is a further object of this invention to provide such a clothes hanger support so constructed that it may be supported in the top of the automobile by means of upward tension exerted by an adjustable supporting member reaching to the floor of the automobile.

It is an additional object of my invention to provide a garment hanger support for use in automobiles in which some provision is made for having the uppermost part of the support match or fit the under side of the top of the automobile body.

Other and further objects of this invention will be evident from reference to this specification and claims and to the accompanying drawing in which similar reference characters refer to similar parts through the several views, and in which:

Figure 1 is a side elevational view of my clothes hanger support showing a part broken away and certain cooperating structure in section.

Figure 2 is a partial vertical section taken along the line II—II of Figure 1 with parts omitted.

Figure 3 is a vertical sectional view taken along the line III—III of Figure 1.

Figure 4 is a vertical sectional view taken along the line IV—IV of Figure 5.

Figure 5 is a side elevational view of a part of my invention showing a modified structure.

Figure 6 is a vertical sectional view of the base of my clothes hanger support taken along the line VI—VI of Figure 1 with a part shown rotated through 90°, and a part shown in elevation.

Figure 7 shows my completed clothes hanger support in position for use in an automobile body of conventional design.

As shown on the drawing, the base 1 is provided with a vertical hole 2 into which passes a rod 3, the lower end of which is threaded as at 4. The height at which the rod 3 stands with respect to said base 1 is adjustable by means of a thumbnut or other adjusting member 5. The rod 3 and base 1 together form a standard for the support of the crosspiece 6. The base may be provided with a cushion 30 of rubber or other resilient material to assist in preventing slippage along the floor of the automobile. In addition, holes 31 may be drilled in the base 1 to bolt the base to the floor of the automobile, though in most cases this will be unnecessary in the preferred modification of my invention.

The clothes hanger supporting member or crosspiece 6 is secured in a slot 7 at the top of rod 3 by a rivet or other retaining member 8 which passes through corresponding holes through the rod 3 and crosspiece 6 as shown at 9 and 10. The slot 7 is made deep enough, as shown at 11, to allow a partial rotation of the crosspiece 6 to obtain the most advantageous fit against the top of an automobile body as shown generally in Fig. 7. A series of hooks 12 or other suitable supporting members for garments or garment hangers are provided along the lower side of the crosspiece 6 for the hanging of articles of clothing on garment hangers or otherwise.

Clamps 13 are slidably attached to the top of the crosspiece 6 and are provided with a resilient cushion 14, preferably made of sponge rubber though ordinary rubber or other resilient material can be used. The resilient material may be applied to the clamp by means of suitable bonding cement as at 15 or by other suitable means. Clamps 13 are preferably made of such size and proportion as to make a tight friction fit on the top and sides of the crosspiece 6. However, I do not limit myself to a clamp having such a friction fit, as other devices may be employed for supporting resilient material at the top of the said crosspiece 6, and for providing the desired adjustability.

One such alternative construction is shown in Fig. 5 in which a modification of my crosspiece is shown at 16 where a single piece of metal is bent to form a crosspiece with a slot for retaining resilient material shown generally at 17 which is more restricted at its upper edge 18 than at its bottom 19, whereby the rubber or other resilient material 20 is firmly held in place. The rubber 20 may be placed along the entire length of the crosspiece 16 or may be restricted to two or more points as shown at 14 in Figure 1. The hole 21 is used to insert the rivet 8 when this modification of my invention is attached to the top of the rod 3. The series of hooks 22 correspond to the hooks 12 shown in Figure 1 and are for the purpose of hanging articles of clothing either on garment hangers or otherwise.

In use, my clothes hanger support is shown at Figure 7 where the modification shown in Figure 1 is illustrated in place in a conventional automobile body. It is placed in a position in front of the rear seat as shown, on either the right or left hand side of the car as desired. The clamps or clips 13 are adjusted to come under any rib, rod, brace or other protruding object in the car top and the thumbnut 5 is turned forcing the cross piece 6 and the accompanying clips 13 holding the sponge rubber 14 or other resilient material against the car top so that my hanger support is wedged between the top and the floor of the car body at a point between the back seat 23 and the back of the front seat 24.

The clips or clamps 13 may easily be moved along the top edge 25 of crosspiece 6 to correspond with the position of any struts, ribs, braces, rods or other relatively rigid supports or structural elements in the top of the automobile body. Two illustrative structural elements are shown in cross section at 26. Usually there is a cloth lining provided in the car top and this will be interposed between the structural elements 26 and the resilient material 14 as shown at 27. One function of the resilient material 14 is to prevent damage to the cloth lining 27.

The cases where a rigid car body has no structural elements such as 26 over the space where it is desired to erect my device, the sponge rubber 14 may bear directly on the under side of the material forming the top. In the case of automobiles having tops of canvas or other flexible material, my device can still be used by bringing the sponge material 14 or its equivalent 20 to bear against the ribs which support the flexible material.

The contour of the top edge 25 of crosspiece 6 or the top edge 28 of crosspiece 16 may be varied as need be to fit the requirements of the models of automobiles in use and need not be restricted to the ones shown, which are to be regarded as merely illustrative of my invention.

In the preferred modification of my invention, the turning of the thumbnut or other threaded member 5 results in the application of stress vertically between the top and bottom of the car body causing strain to be set up in both the said body and in my device, thus holding it in place. As stress is applied, the strain is at first more evident in the deformation of the rubber 14 or 20 one purpose of which is the protection of the cloth or other lining 27 of the top of the automobile body and as more stress is applied, more strain occurs in other elements.

It will be noted that when properly installed and the thumbnut or other threaded member 5 has been screwed down until my device is securely in place, its length may exceed the free space available in the car body at the point of installation by a very small amount so that the car body and also the parts of my device are flexed very slightly, and it is the tendency of these objects to assume their original shape that results in the tension which supports my device in place.

The clothes hanger supports or hooks 12 may not only serve as a means of hanging garment hangers but garments may be hung directly on the hooks. This may be the most convenient method in instances where loops for hanging are provided as an integral part of certain garments.

I have also found another use for my invention which further enhances its value. On long trips it is often desirable to have a pillow behind one's back and when this device is used, a pillow may be supported from a clothes hanger suspended on my device and hooked into one of the hooks 12 or 22 or supported in a separate hole as at 29. This pillow may drop upon the back of the front seat where it will be in a convenient position in which it is difficult to retain a pillow without support from above.

While I have illustrated the retaining member 8 as a rivet, if it is desired to take down the service a screw or any other means which will permit takedown or collapsibility may be substituted. Where collapsibility and the takedown features are not desired and particularly where permanent installation is desirable, use may be made of the holes 31 to screw the base 1 to the floor or other means may be used to attach the device to the car in a more or less permanent manner.

While I have shown a specific means of attaching clothes hangers to my device and other specific constructions such as the means of attaching my horizontal piece 6 to the rod 3 and a specific means for providing adjustability of the height of my device, all of which represent the preferred embodiment of my invention; yet, nevertheless, these are details of construction which can be varied and other known mechanical elements and combinations substituted therefor without departing from the broader principles of my invention and without losing all of the advantages thereof.

I am aware, therefore, that many changes may be made and numerous details of construction may be varied through a wide range without departing from the principles of this invention, and I therefore, do not purpose limiting the patent granted hereon otherwise than necessitated by the prior art.

I claim:

An automobile garment hanger support comprising a flat bottom base adapted to engage a flat surface of larger area than said base, a support extending upwardly from said base, a crosspiece having upper and lower surfaces pivotally attached to said top end of said support and being pivotal at its midpoint about a horizontal axis, a plurality of clamp members slidably attached to said upper surface of said crosspiece, and carrying bearing surfaces for engaging the underside of the top of an automobile body, and a plurality of hooks on the said lower surface of said crosspiece for receiving garment hangers.

LOTTIE M. KOHLBECK.

References Cited in the file of this patent

UNITED STATES PATENTS

| Number | Name | Date |
| --- | --- | --- |
| 1,035,100 | Peterson | Aug. 6, 1912 |
| 2,425,146 | Comis et al. | Aug. 5, 1947 |
| 2,472,132 | Walker | June 7, 1949 |
| 2,487,524 | Collins | Nov. 8, 1949 |
| 2,514,790 | Ostrow | July 11, 1950 |
| 2,536,293 | Koses | Jan. 2, 1951 |
| 2,548,992 | McPherson | Apr. 17, 1951 |
| 2,550,150 | Hartley | Apr. 24, 1951 |

FOREIGN PATENTS

| Number | Country | Date |
| --- | --- | --- |
| 2,385 | Great Britain | Feb. 7, 1905 |
| 769,557 | France | June 11, 1934 |